United States Patent [19]
Brenner

[11] 3,845,234
[45] Oct. 29, 1974

[54] MEANS FOR PROTECTING ELECTRICAL RECEPTACLES

[75] Inventor: Stanley S. Brenner, Massapequa, N.Y.

[73] Assignee: Perfect Line Manufacturing Corp., Lindenhurst, N.Y.

[22] Filed: Oct. 25, 1972

[21] Appl. No.: 300,508

[52] U.S. Cl. .................................. 174/67, 339/40
[51] Int. Cl. .......................................... H05k 5/03
[58] Field of Search ...... 174/66, 67; 220/24.2, 24.3; 339/36, 40; 277/164

[56] References Cited
UNITED STATES PATENTS

| | | | |
|---|---|---|---|
| 1,191,192 | 7/1916 | Klein | 220/24.3 |
| 1,933,592 | 11/1933 | Hubbell | 339/40 |
| 2,279,516 | 4/1942 | O'Brien | 339/40 |
| 2,650,262 | 8/1953 | Abbott | 174/66 |
| 2,790,624 | 4/1957 | Lofqvist et al. | 277/164 X |
| 3,028,467 | 4/1962 | Hubbell | 174/66 |
| 3,291,496 | 12/1966 | Wiltse | 277/164 |
| 3,603,602 | 9/1971 | Padula | 277/164 |

FOREIGN PATENTS OR APPLICATIONS

| | | | |
|---|---|---|---|
| 604,241 | 4/1960 | Italy | 339/36 |
| 692,574 | 8/1965 | Italy | 339/36 |

*Primary Examiner*—J. V. Truhe
*Assistant Examiner*—David A. Tone
*Attorney, Agent, or Firm*—James P. Malone

[57] ABSTRACT

A gasket having self sealing slits is mounted over the face of the socket. The slits are mounted over the apertures of the socket so that a plug may be inserted. When the plug is in the socket, the electrical contacts are sealed against, rain, dust, dirt, etc., and when the plug is removed, the slits seal themselves.

6 Claims, 4 Drawing Figures

PATENTED OCT 29 1974  3,845,234
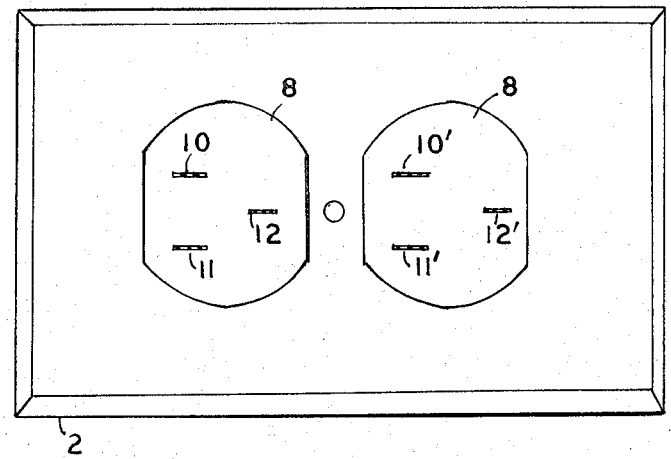
FIG 1
FIG 2
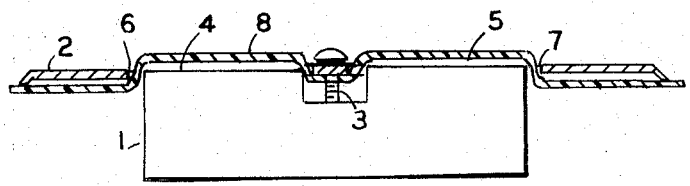
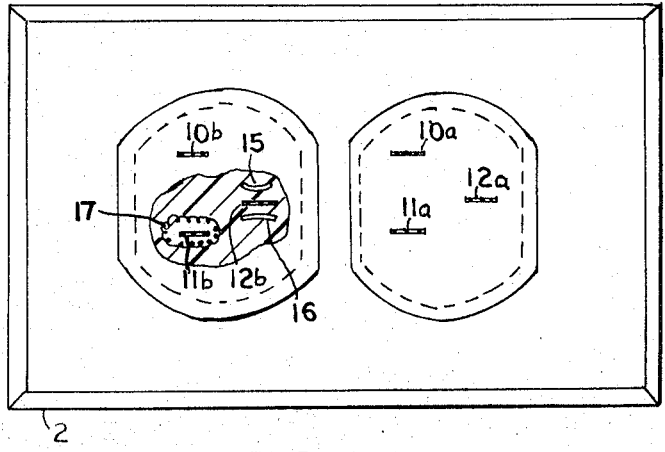
FIG 3
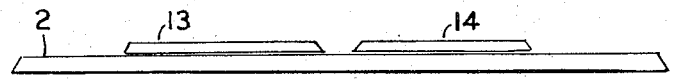
FIG 4

MEANS FOR PROTECTING ELECTRICAL RECEPTACLES

This invention relates to means for protecting electrical sockets from rain, dust, dirt and other foreign materials.

Electrical sockets, especially those mounted outside, must be protected from rain, dust, dirt and other foreign materials. This is generally done by having a snap type cover mounted on the socket.

Electrical sockets are also hazardous to small children who are likely to try to insert metal pieces in the socket aperture resulting in electrical shocks. Children are also known to put their mouth or tongue against the electrical sockets resulting in electrical shocks and mouth burn.

The present invention provides a solution to the above problems by a gasket over the socket face. The gasket has self sealing slits in the front of the aperture. The gasket may be made of compressed rubber, sponge type rubber or a lamination of the above types of rubber. Other materials having sufficient resiliency may also be used. Also, mechanical springs may be imbedded in the gasket adjacent to the slits and enhance the self sealing.

Accordingly, a principal object of the invention is to provide new and improved protection means for electrical receptacles or sockets.

Another object of the invention is to provide new and improved protection means for electrical receptacles, comprising a self sealing gasket mounted over the socket face, the gasket having slits to permit entry of the electrical plug.

Another object of the invention is to provide new and improved portection means for electrical receptacles, comprising a self sealing gasket mounted over the socket face, the gasket having slits to permit entry of the electrical plug wherein the gasket is made of rubber or equivalent material having good self sealing properties.

Another object of the invention is to provide new and improved protection means for electrical receptacles comprising a self sealing gasket mounted over the socket face, the gasket having slits to permit entry of the electrical plug wherein the gasket is made of rubber or equivalent material having good self sealing properties and wherein the gasket has resilient spring means imbedded adjacent to the slits.

These and other objects of the invention will be apparent from the following specification and drawings, of which:

FIG. 1 is a front view of an embodiment of the invention.

FIG. 2 is a side view, partly in section of the embodiment of FIG. 1.

FIG. 3 is a front view of another embodiment of the invention.

FIG. 4 is a side view of FIG. 3.

Referring to the Figures, FIGS. 1 and 2 show a conventional electrical receptacle 1, of the type having two sockets. The receptacle is mounted on a face plate 2, by means of the screw 3. The receptacle 1 has two raised sockets, 4 and 5, which are adapted to extend through corresponding apertures, 6 and 7, in the face plate 2.

A gasket 8 is clamped between the receptacle 1 and extends over the sockets 4 and 5. The gasket 8 is inserted by removing the screw 3 and removing the receptacle 1, from the face plate 2. The gasket is then sandwiched between the back of the face plate and the front of the receptacle 1 and the screw 3 is then inserted through a hole in the gasket and tightened up.

The gasket has slits 10, 11, 12 and 10', 11', 12', which are adapted to fit over the apertures in the conventional electrical socket. The gasket is preferably made of rubber or equivalent material having good self sealing characteristics so that when the plug is removed from the socket the apertures will be protected from the entry of foreign materials, such as, rain, dust, dirt, and will discourage children from inserting anything into the live receptacle. The gasket may be made of compressed rubber and closed cell blown rubber laminated together. If desired, the gasket may extend beyond the edges of the face plate to insure a good seal against the wall. When the plug is inserted in the socket the gasket will provide a good seal around the face of the plug.

FIGS. 3 and 4 show another embodiment of the invention wherein the gaskets are small members 13 and 14 which may be cemented around the edges to the face plate 2. These gaskets also have corresponding slits 10a, 11a, 12a, 10b, 11b, 12b.

If desired, mechanical springs may be imbedded in the gaskets, such as, the springs 15, 16, 17, shown in FIG. 3. This type gasket may be attached to an extension receptacle or the entire receptacle of an extension cord may be molded with self sealing slits. The slits may be marked or outlined in different colors to facilitate proper insertion of the plugs.

I claim:

1. A conventional electrical socket of the type having a conventional faceplate with openings, said socket having apertures to receive prongs of an electrical plug, the socket extending through the openings in said faceplate,
a removable resilient gasket mounted over said conventional socket and extending through said faceplate openings under said faceplate,
said gasket having self-sealing slits in front of said apertures,
whereby an electrical plug may be inserted through said slits into said socket,
and when said plug is withdrawn, said slits will seal themselves, said gasket being removably sandwiched between said socket and said faceplate.

2. Apparatus as in claim 1, wherein the said gasket is made of compressed rubber for good sealing.

3. Apparatus as in claim 1, wherein said gasket is made of compressed rubber and closed cell blown rubber laminated together.

4. Apparatus as in claim 1, wherein said gasket has a resilient spring imbedded therein, surrounding one of said slits,
said spring means being adapted to seal said slits.

5. Apparatus as in claim 1 wherein said gasket extends over the top of said socket and is clamped to the socket body.

6. Apparatus as in claim 1, wherein said gasket is affixed to the face plate of said socket.

* * * * *